US010024241B2

(12) United States Patent
Miller et al.

(10) Patent No.: US 10,024,241 B2
(45) Date of Patent: Jul. 17, 2018

(54) TURBINE ENGINE FACE SEAL ARRANGEMENT INCLUDING ANTI-ROTATION FEATURES

(71) Applicant: United Technologies Corporation, Hartford, CT (US)

(72) Inventors: Jonathan Logan Miller, Ware, MA (US); Nasr A. Shuaib, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 255 days.

(21) Appl. No.: 14/776,708

(22) PCT Filed: Mar. 10, 2014

(86) PCT No.: PCT/US2014/022520
§ 371 (c)(1),
(2) Date: Sep. 14, 2015

(87) PCT Pub. No.: WO2014/150187
PCT Pub. Date: Sep. 25, 2014

(65) Prior Publication Data
US 2016/0025013 A1      Jan. 28, 2016

Related U.S. Application Data

(60) Provisional application No. 61/787,022, filed on Mar. 15, 2013.

(51) Int. Cl.
*F02C 7/28*      (2006.01)
*F02C 7/06*      (2006.01)
(Continued)

(52) U.S. Cl.
CPC .............. *F02C 7/28* (2013.01); *F01D 11/003* (2013.01); *F01D 25/183* (2013.01);
(Continued)

(58) Field of Classification Search
CPC .. F02C 7/06; F02C 7/28; F01D 25/183; F01D 25/186; F05D 2240/55; F05D 2240/56;
(Continued)

(56) References Cited

U.S. PATENT DOCUMENTS 3,025,115 A   3/1962   Shevchenko et al.
4,114,900 A   9/1978   Wiese
(Continued)

FOREIGN PATENT DOCUMENTS

CN    201507644      6/2010
WO    2014107161     7/2014

OTHER PUBLICATIONS

The National Academy of Sciences, Decadal Plan for Aeronautics, Jul. 18, 2006 and Sep. 26, 2006, U.S. Government, p. 228.*
(Continued)

*Primary Examiner* — Gerald L Sung
*Assistant Examiner* — Marc Amar
(74) *Attorney, Agent, or Firm* — Carlson, Gaskey & Olds, P.C.

(57) ABSTRACT

A turbine engine includes a main shaft bearing compartment seal. The seal includes at least an approximately circular seal portion and a seal carrier disposed about the approximately circular seal portion. A plurality of anti-rotation pins maintain the seal carrier in position relative to a housing and are received in an anti-rotation slot of the seal carrier.

14 Claims, 3 Drawing Sheets

(51) Int. Cl.
*F01D 25/18* (2006.01)
*F02C 3/04* (2006.01)
*F16J 15/34* (2006.01)
*F01D 11/00* (2006.01)

(52) U.S. Cl.
CPC .............. *F01D 25/186* (2013.01); *F02C 3/04* (2013.01); *F02C 7/06* (2013.01); *F16J 15/3456* (2013.01); *F05D 2240/55* (2013.01); *F05D 2250/41* (2013.01); *F05D 2260/30* (2013.01)

(58) Field of Classification Search
CPC .............. F05D 2240/59; F05D 2250/41; F05D 2250/42
See application file for complete search history.

(56) References Cited

U.S. PATENT DOCUMENTS

| | | | | |
|---|---|---|---|---|
| 4,289,360 | A | * | 9/1981 | Zirin ................... F16F 15/0237 384/462 |
| 5,014,999 | A | | 5/1991 | Makhobey |
| 5,036,711 | A | * | 8/1991 | Good ........................ G01F 1/46 73/861.66 |
| 5,174,584 | A | | 12/1992 | Lahrman |
| 6,131,914 | A | | 10/2000 | Proveaux |
| 6,196,790 | B1 | | 3/2001 | Sheridan et al. |
| 7,984,911 | B2 | | 7/2011 | Dobek et al. |
| 8,109,716 | B2 | | 2/2012 | Glahn et al. |
| 2007/0096398 | A1 | | 5/2007 | Miller et al. |
| 2007/0096399 | A1 | * | 5/2007 | Miller ..................... F01D 11/00 277/377 |
| 2007/0108704 | A1 | | 5/2007 | Craig et al. |
| 2008/0042364 | A1 | | 2/2008 | Zheng et al. |
| 2009/0121441 | A1 | | 5/2009 | Miller et al. |
| 2014/0311161 | A1 | * | 10/2014 | Bellabal .................. F01D 5/145 60/796 |

OTHER PUBLICATIONS

SJ Shaffer, Ph.D., Tribology 101—Introduction to the Basics of Tribology, Jan. 29, 2013, Bruker-TMT, at least slides 3 and 56.*
Serope Kalpakjian, Manufacturing Processes for Engineering Materials, 1997, Addison Wesley Longman, Inc., Third Edition, pp. 151-160.*
Extended European Search Report for Application No. 14770119.7 dated May 9, 2016.
International Preliminary Report on Patentability for PCT Application No. PCT/US2014/022520, dated Sep. 24, 2015.
International Search Report for PCT Application No. PCT/US2014/022520 dated Jun. 20, 2014.

* cited by examiner

TURBINE ENGINE FACE SEAL ARRANGEMENT INCLUDING ANTI-ROTATION FEATURES

TECHNICAL FIELD

The present disclosure relates generally to a main shaft bearing compartment seal for a turbine engine, and more particularly to a turbine engine main shaft bearing compartment seal including anti-rotation features.

BACKGROUND OF THE INVENTION

Advanced high performance engines, such as those used in commercial jetliners, utilize main shaft bearing compartment seals to seal a main shaft bearing compartment and minimize lubricant from escaping the bearing compartment. Carbon seals are typically used for this purpose, and enable the engine and bearing compartment to function with minimal impact on the thrust specific fuel consumption, thermal management system, or the lubrication system.

Existing engine main shaft seals experience elevated occurrences of anti-rotation slot wear and sporadic anti-rotation sleeve/pin wear (alternately referred to as notching). These wear conditions have a negative impact on the reliability metrics of an engine incorporating the existing engine main shaft seals. Existing engine main shaft seals utilize hard chrome plating to minimize wear conditions. The hard chrome plating has a negative impact on current Green Engine Materials of Concern metrics.

SUMMARY OF THE INVENTION

A turbine engine according to an exemplary embodiment of this disclosure, among other possible things includes a compressor section, a combustor in fluid communication with the compressor section, a turbine section in fluid communication with the combustor, a main shaft interconnecting each of the compressor section, the combustor and the turbine section, and a main shaft bearing compartment including a main shaft bearing compartment seal, the main shaft bearing compartment seal further includes, an at least approximately circular seal, a seal carrier disposed about the seal, the seal carrier maintains the seal in a position, a housing surrounding the seal carrier, the seal carrier is maintained in position relative to the housing via a plurality of springs, a plurality of anti-rotation pin assemblies rigidly connected to the housing on a first end and received in an anti-rotation slot of the seal carrier on a second end, the anti-rotation pins are aligned axially with the seal carrier and the seal, and each of the anti-rotation slots comprises an elongated seal carrier contact surface contacting the anti-rotation pin assembly.

In a further embodiment of the foregoing turbine engine, each of the anti-rotation pin assemblies includes a pin body, a sleeve disposed about the pin body and an end cap connected to the pin body, the pin body and the end cap are arranged such that the sleeve cannot be removed while the end cap is attached to the pin body.

In a further embodiment of the foregoing turbine engine, the sleeve contacts the elongated seal carrier contact surface.

In a further embodiment of the foregoing turbine engine, the sleeve and the pin are hard relative to the elongated seal carrier contact surface.

In a further embodiment of the foregoing turbine engine, an exterior surface of the sleeve and the sleeve pin has a reduced roughness relative to a roughness of the elongated seal carrier content surface roughness, thereby minimizing sleeve and pin notching.

In a further embodiment of the foregoing turbine engine, each of the anti-rotation pin assemblies is characterized by an absence of chrome plating.

In a further embodiment of the foregoing turbine engine, the seal carrier includes a single failure mode, and the single failure mode is slot wear.

In a further embodiment of the foregoing turbine engine, the elongated seal carrier contact surface has an axial length longer than an axial length of a support portion of the seal carrier.

A seal arrangement for a turbine engine according to an exemplary embodiment of this disclosure, among other possible things includes an at least approximately circular seal, a seal carrier disposed about the seal, the seal carrier maintains the seal in a position, a housing surrounding the seal carrier, the seal carrier is maintained in position relative to the housing via a plurality of springs, a plurality of anti-rotation pin assemblies rigidly connected to the housing on a first end and received in an anti-rotation slot of the seal carrier on a second end, the anti-rotation pins are aligned axially with the seal carrier and the seal, and each of the anti-rotation slots includes an elongated seal carrier contact surface contacting the anti-rotation pin assembly.

In a further embodiment of the foregoing seal arrangement for a turbine engine, each of the anti-rotation pin assemblies includes a pin body, a sleeve disposed about the pin body and an end cap connected to the pin body, the pin body and the end cap are arranged such that the sleeve cannot be removed while the end cap is attached to the pin body.

In a further embodiment of the foregoing seal arrangement for a turbine engine, the sleeve contacts the elongated seal carrier contact surface.

In a further embodiment of the foregoing seal arrangement for a turbine engine, the sleeve and pin are hard relative to the elongated seal carrier contact surface.

In a further embodiment of the foregoing seal arrangement for a turbine engine, an exterior surface of the sleeve and an exterior surface of the pin have a reduced roughness relative to a roughness of the elongated seal carrier content surface roughness, thereby minimizing sleeve and pin notching.

In a further embodiment of the foregoing seal arrangement for a turbine engine, each of the anti-rotation pin assemblies is characterized by an absence of chrome plating.

In a further embodiment of the foregoing seal arrangement for a turbine engine, the seal carrier includes a single failure mode, and the single failure mode is slot wear.

In a further embodiment of the foregoing seal arrangement for a turbine engine, the elongated seal carrier contact surface has an axial length longer than an axial length of a support portion of the seal carrier.

These and other features of the present invention can be best understood from the following specification and drawings, the following of which is a brief description.

DETAILED DESCRIPTION OF AN EMBODIMENT

Figure 1:
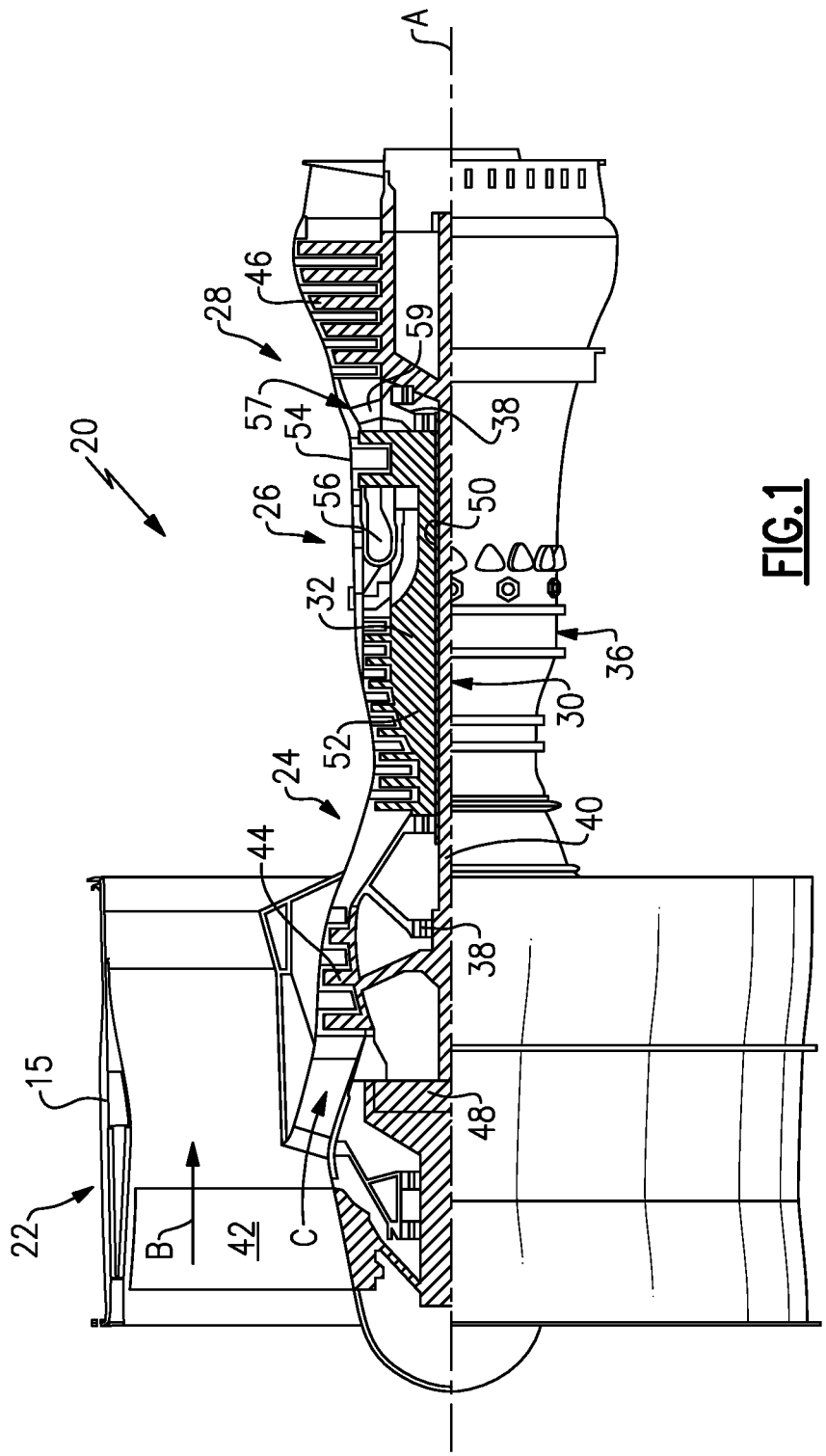
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 is, in one example, a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
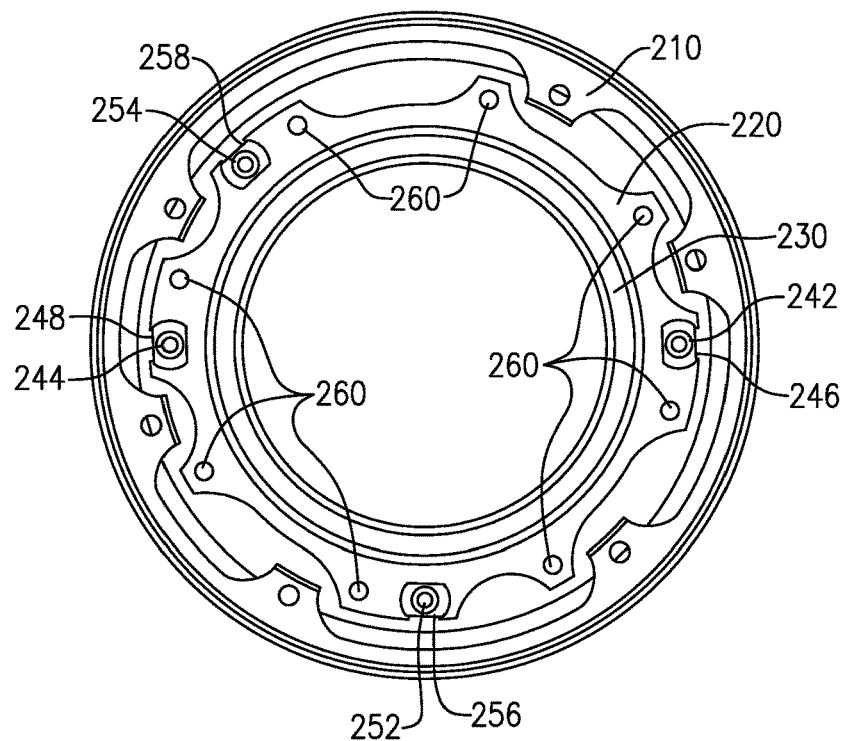
FIG. 2 schematically illustrates a front view of a main engine shaft seal arrangement.

FIG. 2 illustrates a side sectional view of a turbine engine 20 main shaft seal arrangement 200. The main shaft seal arrangement 200 includes a housing 210 surrounding a seal carrier 220. Disposed within the seal carrier 220 is a seal 230 such as a carbon seal. The seal 230 is at least approximately circular and seals a main shaft bearing compartment of the turbine engine 10. The seal carrier 220 is prevented from rotating about the engine centerline axis A via two anti-rotation pin assemblies 242, 244 that interface with the seal carrier 220. The anti-rotation pin assemblies 242, 244 are each positioned in a corresponding anti-rotation slot 246, 248 of the seal carrier 220. Two assembly guide pins 252, 254 further aid in prevention of damage or disengagement of the seal assembly during handling or installation of the seal into the turbine engine 20. Each of the assembly guide pins 252, 254 are positioned in assembly guide slots 256, 258.

Figure 4:
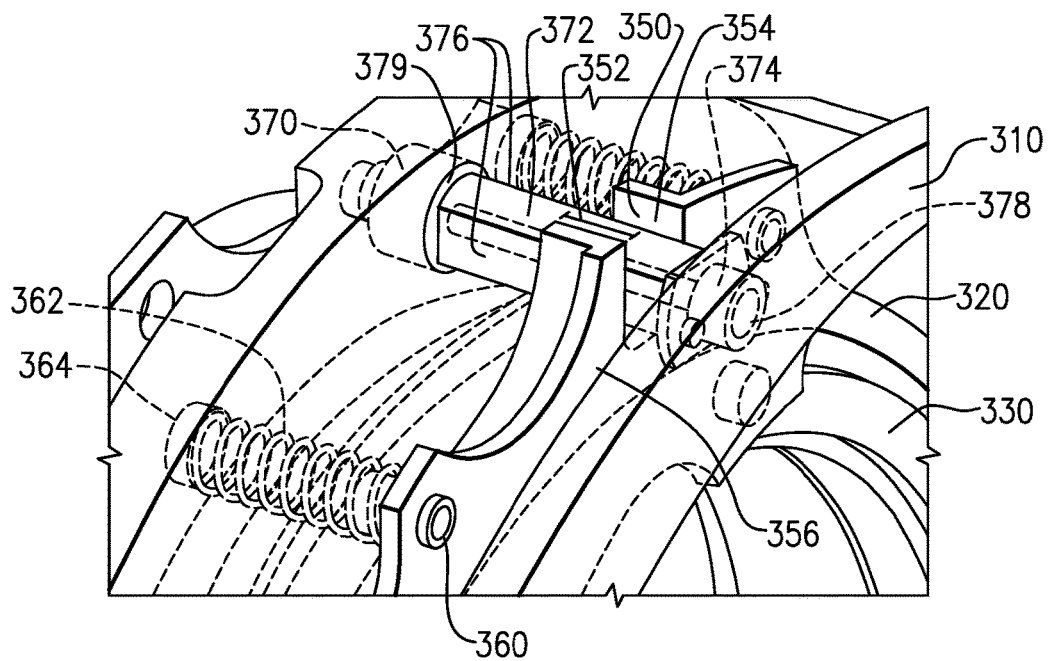
FIG. 4 schematically illustrates an isometric sectional view of a main engine shaft seal anti-rotation pin slot.
Figure 5:
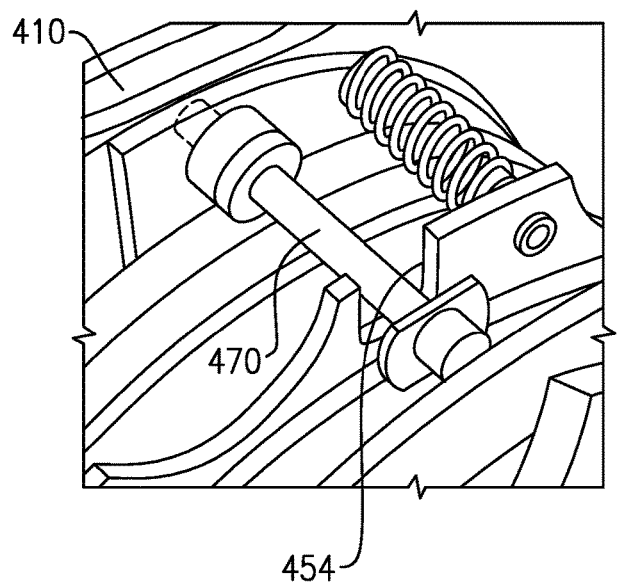
FIG. 5 schematically illustrates an isometric sectional view of a main engine shaft seal assembly guide pin slot.

The seal carrier 220 is positioned axially relative to the housing 210 using multiple springs (illustrated in FIGS. 4 and 5). The springs are spaced circumferentially about the seal carrier 220 and interfaces with the seal carrier 220 via multiple spring fastener features 260 (or guides). The springs provide axial loading to maintain contact between the seal 230 and a rotating sealplate, that is part of the spool or shaft assembly.

Figure 3:
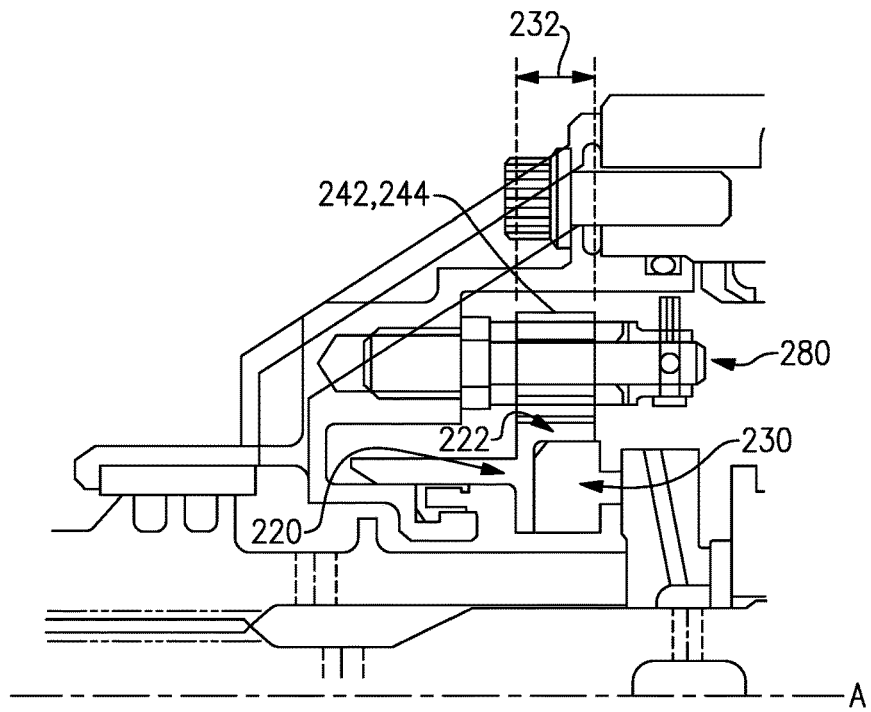
FIG. 3 schematically illustrates a cut out side view of the main engine shaft seal of FIG. 2.

FIG. 3 illustrates a cross sectional side view of the main shaft seal arrangement 200 of FIG. 2. The seal carrier 220 includes a primary body portion 222 that holds a seal 230 in place. Extending radially outward from the primary body portion 222 of the seal carrier 220 is an anti-rotation slot 242, 244. An anti-rotation pin assembly 280 is positioned within the anti-rotation slot 242, 244 and prevents the seal carrier 220 from rotating about the engine centerline axis A. The anti-rotation slot 242, 244 includes an axially elongated section 232. The axially elongated section 232 provides a greater surface area for contact between the anti-rotation pin assembly 280 and the anti-rotation slot 242, 244. The larger contact surface area resulting from the elongated section 232 reduces the contact pressure placed on the contact surface by the anti-rotation pin assembly 280 by spreading the load over a greater area. Reducing the contact pressure in turn decreases the rate at which the anti-rotation pin assembly 280 wears the contact surface and increases the lifespan of the seal arrangement 200.

The seal carrier 220 also includes multiple receiving slots for receiving the assembly guide pins 252 illustrated in FIG. 2. The assembly guide slots 256, 258 do not include the illustrated elongated section 232. Inclusion of the elongated section 232 in the assembly guide slots 256, 258 is unnecessary because the assembly guide pins 252 do not contact the seal carrier 220 after assembly is completed, unless the seal carrier 220 is already in a failure mode.

FIG. 4 illustrates an isometric sectional view of a main engine shaft seal arrangement. As with the previously described examples of FIGS. 2 and 3, a main engine shaft seal 330 is circumferentially surrounded by a seal carrier 320. The seal carrier 320 is loaded axially using multiple springs 362. Each of the springs interfaces with, or is guided by, a spring retention feature 360 on the seal carrier 320 on one axial end of the spring 362 and contacts the housing 310 on an opposite axial end 364 of the spring 362.

The seal carrier 320 includes two approximately identical anti-rotation slots 350. A first anti-rotation slot 350 is illustrated in FIG. 4, and the other anti-rotation slot 350 is disposed 180 degrees apart from the first anti-rotation slot 350 such that the two anti-rotation slots 350 are opposing each other. Each anti-rotation slot 350 includes at least one axially elongated axial contact surface 354. The illustrated example includes two facing axially elongated contact surfaces 354 in each anti-rotation slot 350. The axially elongated contact surface 354 is elongated along the engine centerline axis A (illustrated in FIGS. 1 and 3) relative to a support portion 356 of the seal carrier 320.

An anti-rotation pin assembly 370 is positioned in the anti-rotation slot 350. The anti-rotation pin assembly 370 includes a central anti-rotation pin 378 radially surrounded by a sleeve 372. The sleeve 372 abuts a pin feature 379 on one end and an anti-rotation pin cap 374 on an opposite end. The anti-rotation pin cap 374 is connected to the end of the pin 378 using any known fastening technique. The pin feature 379 and the anti-rotation pin cap 374 maintain the sleeve 372 in position about the anti-rotation pin 378 and maintain the pin in the pin retention slot. The anti-rotation pin assembly 370 is rigidly fixed to the housing on one end and contacts each of the elongated axial contact surfaces 354 along a sleeve surface 376. The axial retention pin cap 374 prevents the seal carrier 320 from moving axially out of position.

When a tangential vector force is applied to the seal 330, the force is transferred to the seal carrier 320, causing the seal carrier 320 to rotate and the pin sleeve 372 to contact the axially elongated contact surface 354. The anti-rotation pin assembly 370 prevents the seal carrier 320 from continuing to rotate about the engine centerline axis A after the pin sleeve 372 contacts the axially elongated contact surface 354. During operation of the turbine engine 20, the engine parts expand and contract causing the parts to axially shift. To facilitate this axial shifting, the springs 362 compress or extend in order to maintain a desired axial load. A greater contact surface area between the sleeve walls 372 and the axially elongated contact surface 354 results in a lesser wear of the contact surface 354. The axial length 352 of the axially elongated axial contact surface 354 is maximized within allowable tolerances. In one example, the axially elongated contact surface 354 has an axial length 352 equal to an axial length from an edge of the seal carrier 320 to the housing 310 minus an axial movement tolerance of the seal carrier 320.

In a standard configuration, this type of rubbing can result in two possible wear patterns, each with its own associated failure mode. In one wear pattern, the seal carrier 320 wears into the anti-rotation pin assembly 370 in a wear process referred to as "notching". Notching can result in a sudden and dramatic failure. In the opposite wear pattern, the sleeve 370 wears into the axially elongated contact surface 354 in a wear process referred to as "slot wear." Slot wear occurs over a longer period of time, and does not result in sudden or dramatic failure. Thus, slot wear is a more benign failure mode than notching.

In order to ensure that the seal carrier arrangement enters the more benign slot wear failure mode when a failure occurs, the pin sleeve 372 is constructed of a material that is hard relative to the axially elongated contact surfaces 354. Furthermore, the surface texture or roughness is targeted to encourage the sleeve 372 to resist wear more than the slot 354. By ensuring that the pin sleeve 372 is harder than the axially elongated contact surfaces 354, and the roughness are appropriately targeted, the arrangement ensures that the pin sleeve 372 will abrade the axially elongated contact surface 354, rather than vice versa, when rubbing between the pin sleeve 372 and the axially elongated contact surface 354 occurs. Another factor that can affect the failure mode is contact between a guide pin and the corresponding pin slot. With this in mind, the circumferential clearance of the pin slot is set to avoid pin notching failure mode by increasing the clearance between the pin and the pin slot as much as possible.

Previous designs utilized a chrome based plating to reduce wear between the sleeve 372 and the axially elongated contact surface 354. The manufacturing processes utilized to chrome plate the sleeve 372 and the axially elongated contact surfaces 354 negatively impacts current Green Engine Materials of Concern metrics, and as such chrome plating is an undesirably wear solution.

An example process used to reduce the wear in place of the chrome plating is controlling the roughness of the contacting surfaces 354, 376. The roughness of both the seal carrier sleeve 372 and the axially elongated contact surfaces 354 is controlled to encourage minimal wear of the sleeve 372, thereby reducing the wear from contact rubbing between the axially elongated contact surface 354 and the anti-rotation pin sleeve 372.

FIG. 5 illustrates an isometric sectional view of a main engine shaft seal assembly guide pin slot 454. Unlike the anti-rotation pin assembles 370 illustrated in FIG. 4, assembly guide pins 470 are a single assembly guide pin 470 component connected on one axial end to a housing 410 and extending through an assembly guide pin slot 454. The assembly guide pin 470 does not contact the assembly guide pin slot 454 during operation unless the seal assembly 400 has entered a failure mode. As a result of the lack of contact, the assembly guide pin 470 does not typically wear against the slot surfaces 454 until a failure has already occurred. The hardness and surface roughness of the slot and pin are also optimized to avoid the failure mode of pin notching.

While the above illustrated example is described with regards to two opposing anti-rotation pins, it is understood that additional anti-rotation pin assemblies can alternately be used to the same effect.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
   a compressor section;
   a combustor in fluid communication with the compressor section;
   a turbine section in fluid communication with the combustor;
   a main shaft interconnecting each of the compressor section, the combustor and the turbine section; and
   a main shaft bearing compartment including a main shaft bearing compartment seal, wherein said main shaft bearing compartment seal further comprises:
   an at least approximately circular seal;
   a seal carrier disposed about said seal, wherein said seal carrier maintains said seal in a position;
   a housing surrounding said seal carrier, wherein said seal carrier is maintained in position relative to said housing via a plurality of springs;
   a plurality of anti-rotation pin assemblies rigidly connected to said housing on a first end and each anti-rotation pin assembly received in a respective anti-rotation slot of said seal carrier on a second end, each of said anti-rotation pin assemblies comprising a pin body, a sleeve disposed about said pin body and an end cap connected to said pin body,
   wherein each of said anti-rotation pin assemblies are aligned axially with said seal carrier and said seal;
   wherein each of said anti-rotation slots comprises an elongated seal carrier contact surface contacting a corresponding one of said anti-rotation pin assemblies;
   and wherein said sleeve and said pin body being hard relative to said elongated seal carrier contact surface.

2. The turbine engine of claim 1, wherein the pin body and the end cap in each of said anti-rotation pin assemblies are arranged such that the corresponding sleeve cannot be removed while the end cap is attached to the pin body.

3. The turbine engine of claim 2, wherein each of said sleeves contacts a corresponding one of said elongated seal carrier contact surfaces.

4. The turbine engine of claim 3, wherein an exterior surface of each of said sleeves and each of said pin bodies has a reduced roughness relative to a roughness of said elongated seal carrier contact surfaces, thereby minimizing sleeve and pin notching.

5. The turbine engine of claim 1, wherein each of said anti-rotation pin assemblies is characterized by an absence of chrome plating.

6. The turbine engine of claim 1, wherein the seal carrier comprises a slot wear failure mode.

7. The turbine engine of claim 1, wherein each of the elongated seal carrier contact surfaces has an axial length longer than an axial length of a support portion of said seal carrier.

8. A seal arrangement for a turbine engine comprising:
   an at least approximately circular seal;
   a seal carrier disposed about said seal, wherein said seal carrier maintains said seal in a position;
   a housing surrounding said seal carrier, wherein said seal carrier is maintained in position relative to said housing via a plurality of springs;
   a plurality of anti-rotation pin assemblies rigidly connected to said housing on a first end and each anti-rotation pin assembly received in a respective anti-rotation slot of said seal carrier on a second end, each of said anti-rotation pin assemblies comprises a pin body, a sleeve disposed about said pin body and an end cap connected to said pin body;
   wherein each of said anti-rotation pin assemblies are aligned axially with said seal carrier and said seal;
   wherein each of said anti-rotation slots comprises an elongated seal carrier contact surface contacting a corresponding one of said anti-rotation pin assemblies;
   and wherein said sleeve and said pin body being hard relative to said elongated seal carrier contact surface.

9. The seal arrangement for a turbine engine of claim 8, wherein said pin body and said end cap in each of said anti-rotation pin assemblies are arranged such that the corresponding sleeve cannot be removed while said end cap is attached to said pin body.

10. The seal arrangement for a turbine engine of claim 9, wherein each of said sleeves contacts a corresponding one of said elongated seal carrier contact surface.

11. The seal arrangement for a turbine engine of claim 10, wherein an exterior surface of each of said sleeves and an exterior surface of each of said pin bodies has a reduced roughness relative to a roughness of a corresponding elongated seal carrier contact surface, thereby minimizing sleeve and pin notching.

12. The seal arrangement for a turbine engine of claim 9, wherein each of said anti-rotation pin assemblies is characterized by an absence of chrome plating.

13. The seal arrangement for a turbine engine of claim 9, wherein the seal carrier comprises a slot wear failure mode.

14. The seal arrangement for a turbine of claim 9, wherein each elongated seal carrier contact surface has an axial length longer than an axial length of a support portion of said seal carrier.

* * * * *